(12) United States Patent
Falcon (10) Patent No.: US 9,131,270 B2
(45) Date of Patent: *Sep. 8, 2015

(54) SIMULCAST RESOLUTION IN CONTENT MATCHING SYSTEMS

(71) Applicant: The Nielsen Company (US), LLC, Schaumburg, IL (US)

(72) Inventor: Fernando Diego Falcon, Milan (IT)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,497

(22) Filed: Apr. 28, 2014

(65) Prior Publication Data

US 2014/0237499 A1 Aug. 21, 2014

Related U.S. Application Data

(63) Continuation of application No. 13/460,222, filed on Apr. 30, 2012, now Pat. No. 8,739,198, which is a continuation of application No. 12/589,702, filed on Oct. 26, 2009, now Pat. No. 8,181,196.

(30) Foreign Application Priority Data

Oct. 31, 2008 (GB) .................................. 0820055.2

(51) Int. Cl.
*H04H 60/32* (2008.01)
*H04N 21/44* (2011.01)
(Continued)

(52) U.S. Cl.
CPC ......... *H04N 21/44008* (2013.01); *H04H 60/56* (2013.01); *H04N 21/835* (2013.01); *H04H 20/67* (2013.01); *H04H 2201/90* (2013.01)

(58) Field of Classification Search
CPC ................................................ H04N 21/44008
USPC ....................................................... 725/18–20
See application file for complete search history.

(56) References Cited

U.S. PATENT DOCUMENTS 8,181,196 B2   5/2012   Falcon
8,739,198 B2   5/2014   Falcon
(Continued)

FOREIGN PATENT DOCUMENTS

CN   102217218   10/2011
EP   1418692   5/2004
(Continued)

OTHER PUBLICATIONS

European Patent Office, "Summons to Attend Oral Proceedings Pursuant to Rule 115(1) EPC," issued in connection with European Application No. 09774927.9, dated Mar. 17, 2014, 10 pages.
(Continued)

*Primary Examiner* — Olugbenga Idowu
(74) *Attorney, Agent, or Firm* — Hanley, Flight & Zimmerman, LLC (57) ABSTRACT

Example methods disclosed herein to identify media sources include determining whether a first time difference between a first meter signature and a second meter signature associated with presented media is equivalent to a second time difference between a first reference signature determined to match the first meter signature and a second reference signature determined to match the second meter signature, the first and second reference signatures being associated with a first one of a plurality of media sources. Such example methods also include, in response to determining that the first time difference and the second time difference are equivalent, appending the second reference signature to a first tracking segment associated with the first one of the media sources to cause a first time length associated with the first tracking segment to be increased based on at least a respective timestamp associated with the second reference signature.

22 Claims, 7 Drawing Sheets

(51) Int. Cl.
*H04H 60/56* (2008.01)
*H04N 21/835* (2011.01)
*H04H 20/67* (2008.01)

(56) References Cited

U.S. PATENT DOCUMENTS

| | | |
|---|---|---|
| 2003/0131350 A1 | 7/2003 | Peiffer et al. |
| 2007/0074147 A1 | 3/2007 | Wold |
| 2008/0229357 A1 | 9/2008 | Candelore et al. |
| 2010/0115543 A1 | 5/2010 | Falcon |

FOREIGN PATENT DOCUMENTS

| | | |
|---|---|---|
| EP | 2362988 | 9/2011 |
| JP | 2005051716 | 2/2005 |
| JP | 2007020195 | 1/2007 |
| JP | 2008085767 | 4/2008 |
| JP | 2012507904 | 3/2012 |
| WO | 9959275 | 11/1999 |
| WO | 0211123 | 2/2002 |
| WO | 2005006768 | 1/2005 |
| WO | 2005011294 | 2/2005 |
| WO | 2005081829 | 9/2005 |
| WO | 2005116793 | 12/2005 |
| WO | 2006026736 | 3/2006 |
| WO | 2008042953 | 4/2008 |

OTHER PUBLICATIONS

Intellectual Property Office of Great Britain, "Examination Report under Section 18(3)", issued in connection with British Patent Application No. GB0820055.2, on May 24, 2013, 4 pages.

European Patent Office, "Exam Report," issued in connection with European Patent Application No. 09774927.9, dated Mar. 12, 2013 (6 pages).

JPO, "Rejection Decision," issued in connection with Japanese Patent Application No. P2011-533850, dated Nov. 13, 2012 (6 pages).

Intellectual Property Office of Great Britain, "Search Report," issued in connection with British Patent Application No. GB0820055.2, completed Feb. 4, 2009, (1 page).

International Searching Authority, "International Search Report and Written Opinion," issued in connection with PCT Application No. PCT/IB2009/007396, mailed Mar. 29, 2010 (10 pages).

International Bureau, "International Preliminary Report on Patentability", issued in connection with PCT Application No. PCT/IB2009/007396, on May 12, 2011 (6 pages).

United States Patent and Trademark Office, "Notice of Allowance," issued in connection with U.S. Appl. No. 12/589,702, on Jan. 19, 2012 (12 pages).

United States Patent and Trademark Office, "Notice of Allowance", issued in connection with U.S. Appl. No. 13/460,222, dated Jan. 8, 2014 (9 pages).

IP Australia, "Examination Report", issued in connection with Australian Patent Application No. 2009309329, dated Jan. 31, 2013 (3 pages).

Canadian Intellectual Property Office, "Office Action", issued in connection with Canadian Patent Application No. 2,742,348, dated Sep. 11, 2014 (3 pages).

European Patent Office, "Decision to refuse a European Patent application", issued in connection with European Patent No. 0977492739, dated Dec. 15, 2014 (11 pages).

Japanese Patent Office, "Notice of Allowance", issued in connection with Japanese Patent Application No. 2011-533850, dated Jan. 7, 2014 (6 pages). (Redacted).

| Viewing segment length (min) | Simulcast Resolved | RLS Resolution factor (%) |
|---|---|---|
| 1 | 6/63 | 9,52 |
| 2 | 14/67 | 20,90 |
| 3 | 22/71 | 30,99 |
| 4 | 30/75 | 40,00 |
| 5 | 38/79 | 48,10 |
| 6 | 46/83 | 55,42 |
| 7 | 54/87 | 62,07 |
| 8 | 62/91 | 68,13 |
| 9 | 70/95 | 73,68 |
| 10 | 78/99 | 78,79 |
| 11 | 86/103 | 83,50 |
| 12 | 94/107 | 87,85 |
| 13 | 102/111 | 91,89 |
| 14 | 110/115 | 95,65 |
| 15 | 118/119 | 99,16 |
| t>15 | 1/1 | 100,00 |

Figure 4

| Viewing Segment Length (L) | Share of Total Viewing Time | RLS Resolution Factor | Simulcast Time Resolved (%) |
|---|---|---|---|
| L ≤ 5 min | 8.0 % | 29.9 % | 2.4 % |
| 5 min ≤ L ≤ 10 min | 7.2 % | 67.6 % | 4.9 % |
| 11 min ≤ L ≤ 15 min | 7.9 % | 85.0% | 6.7 % |
| L > 15 min | 76.9 % | 100.0 % | 76.9 % |
| TOTAL | 100.0 % | | 90.9 % |

Figure 5b

SIMULCAST RESOLUTION IN CONTENT MATCHING SYSTEMS

RELATED APPLICATION(S)

This patent arises from a continuation of U.S. patent application Ser. No. 13/460,222 (now U.S. Pat. No. 8,739,198), entitled "SIMULCAST RESOLUTION IN CONTENT MATCHING SYSTEMS" and filed on Apr. 30, 2012, which is a continuation of U.S. patent application Ser. No. 12/589,702 (now U.S. Pat. No. 8,181,196), entitled "SIMULCAST RESOLUTION IN CONTENT MATCHING SYSTEMS" and filed on Oct. 26, 2009, which claims priority from British Application No. GB0820055.2, entitled "SIMULCAST RESOLUTION IN CONTENT MATCHING SYSTEMS" and filed on Oct. 31, 2008. U.S. application Ser. No. 13/460,222, U.S. application Ser. No. 12/589,702 and British Application No. GB0820055.2 are hereby incorporated by reference in their entireties.

FIELD OF THE DISCLOSURE

The present invention relates to systems and methods for measuring the presence of an audience of a media presentation, in particular to systems and methods using content matching technologies.

BACKGROUND

Apparatuses and methods for measuring the audience of a media presentation, such as a television or a radio program, are well-known in the industry. The knowledge of the size and composition of audiences to television or radio broadcasts associated to certain environments, for example in a home, is of paramount importance for the broadcasting industry in order to value the advertising space included in broadcasts.

The group of viewers cooperating in a television audience survey is called a "panel", while each viewer participating in the panel is called a "panel member". Audience metering apparatuses cooperate with associated media rendering devices or display systems used by panel members for watching television broadcasts at their respective viewing locations. Such metering apparatuses have three main goals, namely: a) determining the content being shown on their associated media devices; b) identifying the broadcast source (e.g. television channel or other audio or video broadcast stream) and the content distribution platform (e.g., analogue terrestrial transmission, digital terrestrial transmission, analogue satellite transmission, cable TV, IPTV, etc.); and c) registering the presence of one or more panel members so that the exposure to the content, broadcast source and platform can be accounted for, so as to produce audience data.

Audience metering systems typically include a set-top box connected to the media device (traditionally a TV set). In order to identify the content, broadcast source and the platform of the viewed program, these metering systems may use one or more different methods available, such as tuner frequency measurement, or recognition of embedded video or audio codes, Service Information, image feature recognition, watermarking, and signatures, amongst others.

In the case of the signature recognition, many systems have been proposed which, essentially, include a metering device that derives signatures continuously either from the audio or video output (or both simultaneously) of the TV set or display device, and store the signatures together with an associated time stamp. The stored signatures generated by the metering devices are later transmitted by modem or any other telecommunications means to a remotely located central base (or station), where they are processed in order to identify all content shown on the monitored TV set or display device This function may be achieved by means of content identification technology comprising a set of techniques and methods that can recognize an unknown segment of audio or video material among a plurality of reference segments generated from known broadcast sources. Persons skilled in the art will acknowledge the existence of methods and algorithms used for content identification by means of the generation and recognition of signatures. Audio and/or video signals are converted into signatures that characterize the media content being analyzed. A pattern correlation engine is then used to identify an unknown piece of content by scanning its signatures against a large set of previously-generated reference signatures. The content being displayed is then determined by analyzing correlation values according to appropriate algorithms in order to provide a wide range of media measurement and monitoring services, of which the most widely used is "Broadcast Identification" (i.e. recognizing a broadcast source being watched on a TV set; in the case of television audience measurement, for example, the broadcast source is typically a television channel).

It may happen, however, that two or more different broadcast sources comprise identical content during certain periods of time. This type of event is known as simulcast transmission, and is characterized by the fact that the scanning engine will find two or more reference signatures matching the signature of the unknown piece of content, generating an ambiguous situation in which the audience measurement system cannot unequivocally assign the content to one broadcast source.

In the case of content matching systems coupled with a source detection metering system, such as the one proposed by Wheeler et al. (U.S. Pat. No. 6,675,383), an approach has been implemented to solve the problem. If the audience metering device can identify the broadcast platform associated to the source providing the signal to the TV set or media rendering device during the simulcast period, the scanning process considers only the reference matching signatures originated on broadcast sources transmitted in the identified platform. This can eventually reduce or even eliminate the ambiguity, except for the case in which the simulcast involves two or more broadcast sources transmitted on the same platform (e.g., two analogue terrestrial channels or two digital satellite channels).

Another approach involves the detection of auxiliary codes or any other type of metadata present in the broadcast signal that could eventually identify the content and/or broadcast source viewed by the panel member(s), as proposed, for example, by Neuhauser et al. (International Patent Publication No. 2004/062282), where audio data is identified based on both a signature characterizing the audio data and additional data obtained from the audio data (as, for example, a source identification code). However, people skilled in the art know that if the codes or metadata are present in the broadcasting signals received by the panel members, code detection is used as the main audience measurement method, and the generation of signatures is usually implemented as a second option when the codes or the metadata streams are not detectable or not present, as proposed by Thomas et al. in U.S. Pat. No. 5,481,294, which describes a household metering apparatus which records ancillary codes or extracts program signatures from the programs if no ancillary codes are found in the broadcast signal. As a general rule, content matching methods are used when the audience measurement system cannot rely upon the full availability of codes or metadata.

A third approach, as suggested by Williams et al. in U.S. Pat. No. 5,945,988, may involve the use of known audience data from the monitored panel member(s) in order to enhance the identification of an audio sample. This solution, however, can only provide a best guess based on historical data.

Finally, the case of simulcast transmission has been addressed by Lee et al. and described in International Patent Publication No. 2005/006768. However, the solution described therein is for the specific case wherein the signatures are generated based on a Cycle Redundancy Check (CRC) or recognition of other predetermined data packet portions of a digital broadcast signal. This method, therefore, cannot solve the problem in the case of analogue broadcast signals, or in the case of audience measurement systems that generate signatures based on time-domain or frequency-domain features of a digital audio or video signal, which might be received remotely having been transmitted through the air from a presenting device (such as a television) as an audio wave or as an electromagnetic wave.

There is, therefore, a need to solve the problem faced by content matching technologies in simulcast cases where complementary information provided from a platform detector is not available or is not sufficient to identify a broadcast source, or broadcast source recognition by means of auxiliary codes or other type of metadata is not feasible.

SUMMARY

The present invention is defined in the claims of this patent.

An audience measurement system generates signatures of unknown pieces of content being viewed by the panel members. The signatures of the unknown pieces of content are stored and transmitted to a central processing site, where they are compared with reference signatures for their identification.

The signatures of the unknown content may be obtained remotely from a media presenting device, such as a television or radio, from an audio wave or an electromagnetic wave passing through the air. Alternatively, the signatures may be obtained directly from the audio or video components (or both) of a broadcast signal from the electrical output of the media presenting device.

A scanning engine finds matches between the signatures of the unknown and known content, and stores consecutive matches so as to build tracking segments, which are strings of matches that indicate a full coincidence between the unknown content and one or more known pieces of content for a certain period of time.

In accordance with yet another aspect of the invention, when the signatures of more than one known piece of content match the signatures of the unknown content, the system associates the unknown content to the known piece of content with the longest tracking segment.

BRIEF DESCRIPTION OF THE DRAWINGS

The invention will now be described, by way of example only, by referring to the enclosed figures of drawing, wherein:

FIG. 5 (which comprises FIGS. 5A and 5B) is a flowchart of the operations performed by a program used to implement the rule of the longest segment.

DETAILED DESCRIPTION

Figure 1:
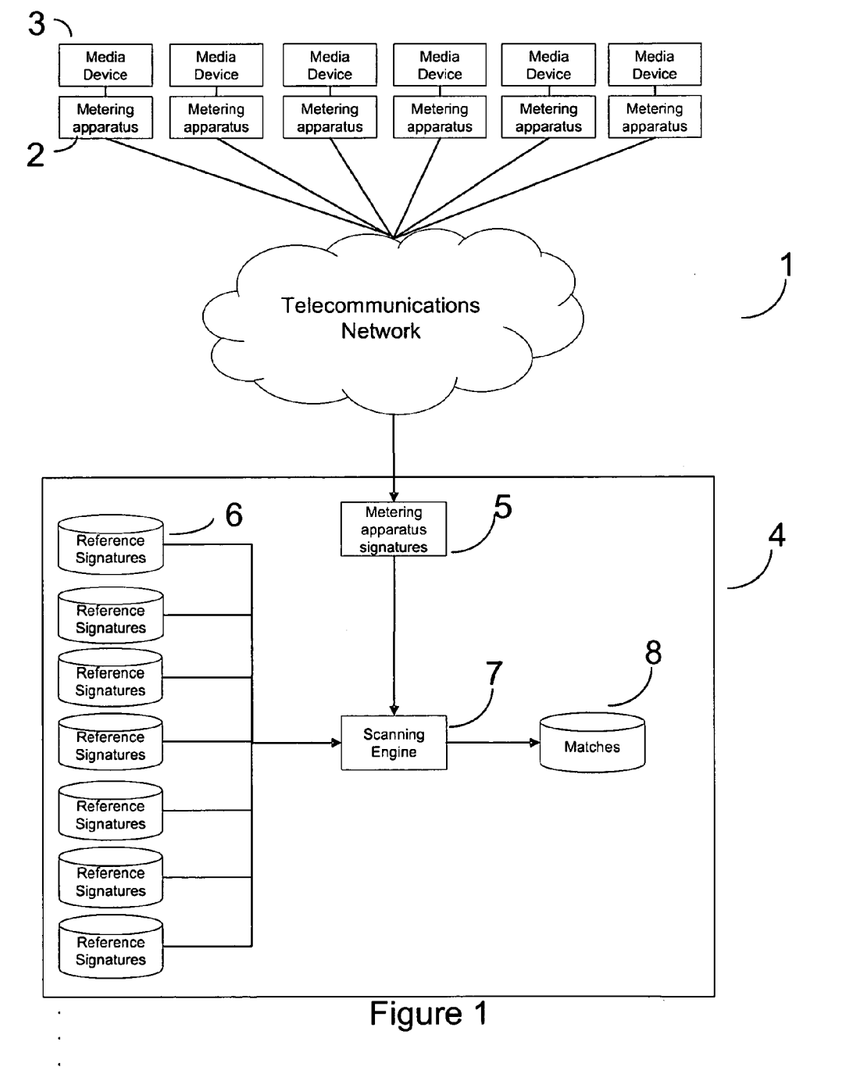
FIG. 1 is a schematic representation of a typical content matching.

In a typical audience measurement system 1 (see FIG. 1) a metering apparatus 2 (called "Meter") is used to measure the viewing activity of one or more members of a household with regards to a predefined media presenting device 3.

Figure 1A:
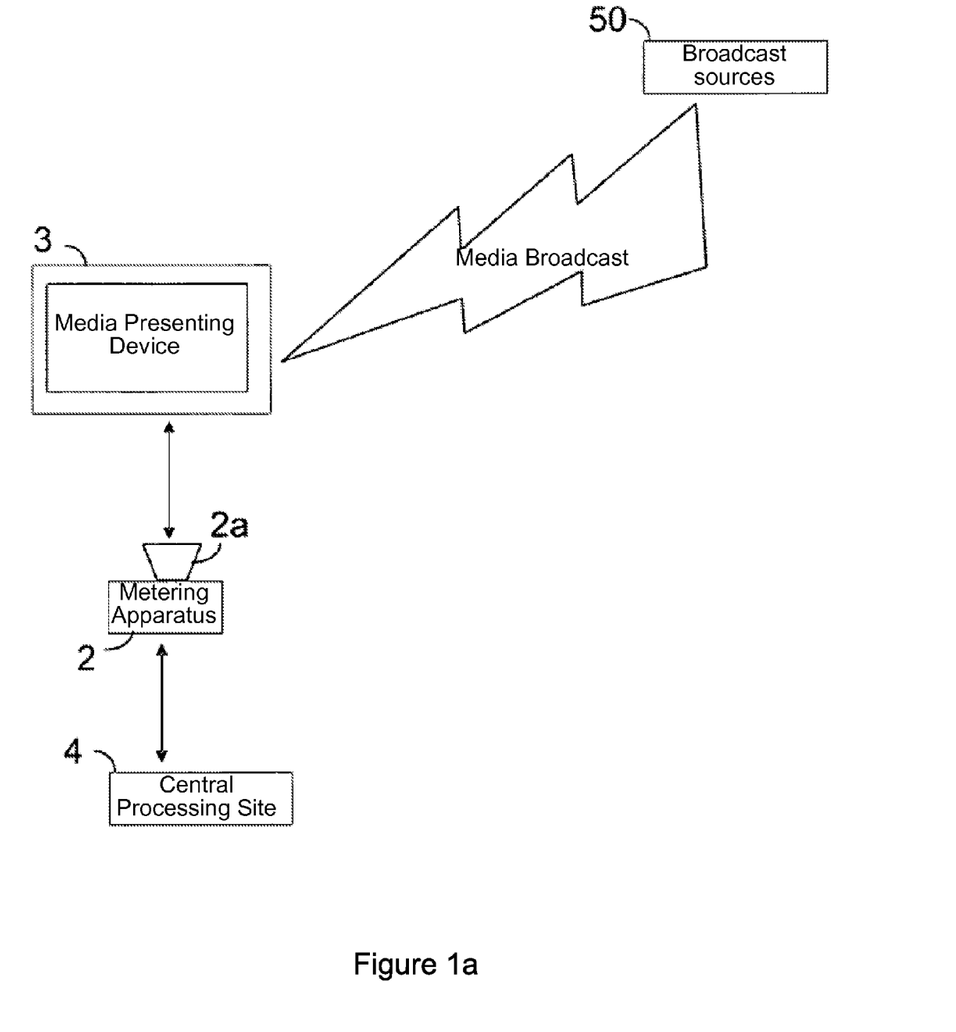
FIG. 1A is a schematic representation of components of FIG. 1.

An individual metering apparatus 2 is shown in more detail in FIG. 1A. Each metering apparatus 2 (of a plurality of metering apparatuses in the measurement system 1) obtains data concerning a broadcast, which is being received from one of a plurality of broadcast sources 50 and accessed on media presenting device 3 by a user. As shown in FIG. 1A, the depicted metering apparatus 2 comprises an audio transducer 2a that receivers an audio signal (transmitted from the media presenting device 3 as sound through the air). The audio signal is converted into an electrical signal from which a signature is generated corresponding to the unknown content being viewed on multimedia presenting device 3. Alternatively, the metering apparatus 2 may be directly connected to a video or audio electrical output of the media presenting device 3.

Each metering apparatus 2 stores and transmits those generated signatures to a central processing site 4. The transmission may take place over a telephone line, internet connection (wireless or LAN), cellular network or any other communications network providing support for transfer of data. The metering apparatus' signatures of unknown content 5 are then compared to reference signatures 6 by means of a scanning engine 7 at the central processing site 4 that outputs the corresponding matches 8.

Figure 2:
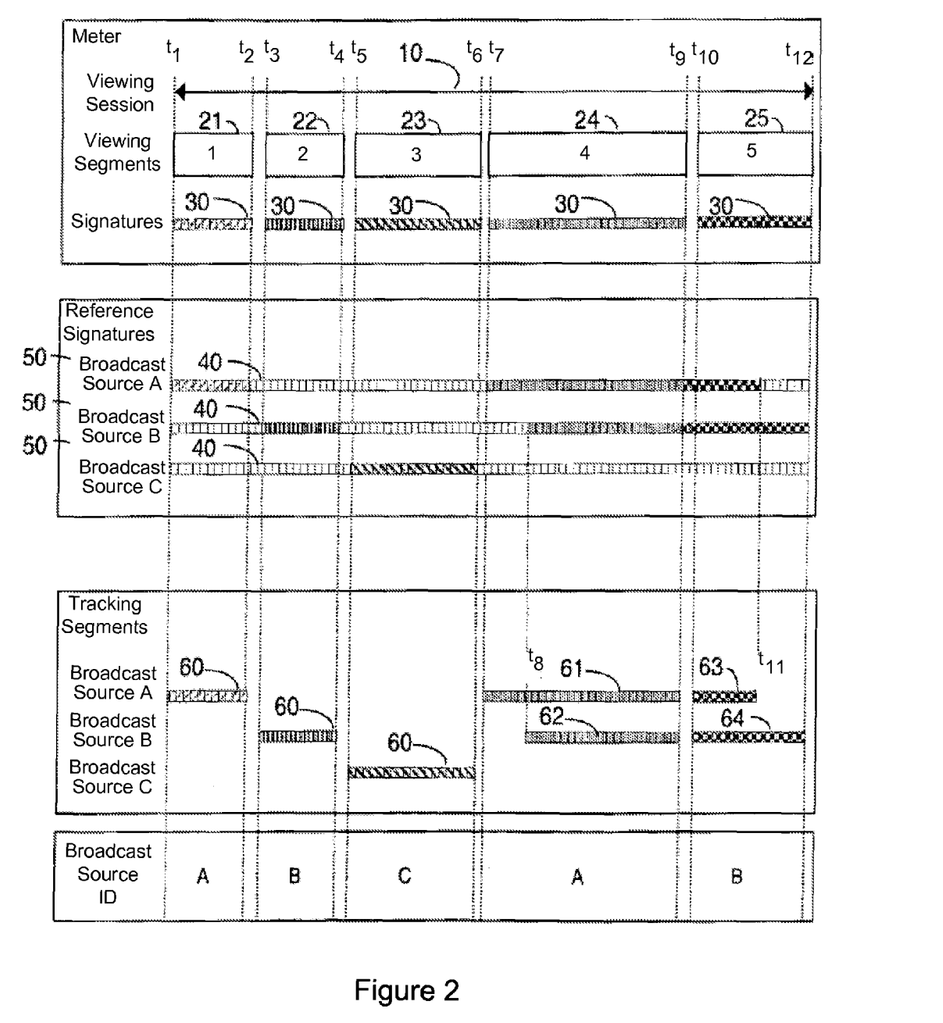
FIG. 2 is an illustration of a sequence of viewing segments detected by a meter and its corresponding signatures; a stream of reference signatures to which the former are compared; a resulting tracking segment; and a broadcast source attribution.

A "viewing session" is defined as a period of time when the multimedia presenting device 3 is on, and a panel member has registered his or her presence. An example of such a system is described in the applicant's co-pending International Patent Application, published under No. 2008/072094, which is herein incorporated by reference. FIG. 2 shows a schematic diagram of a metered viewing session. In the example shown in FIG. 2, a viewing session 10 starting at a time t1 and ending at a time t2 is represented. Each viewing session, in turn, is divided into "viewing segments" (21, 22, 23 24 25 in the figure), i.e. a period of time wherein the same broadcast source is tuned into at the multimedia presenting device 3. The minimum length of time that is considered by the audience measurement system 1 as a viewing session is called "persistence threshold" and its value is defined during the system set up process. A value of fifteen seconds is used in most countries, and will be assumed in the description that follows.

In the case of content matching systems, each metering device 2 generates signatures 30 of the content present during the viewing segments, and the signatures 30 are then sent to a central processing site 4 for identification. The signatures 30 of the viewing segments are compared to the "reference signatures" 40, i.e., the signatures of all the possible broadcast sources 50 that can be viewed by the monitored media presenting device. For each broadcast source 50, therefore, a stream of signatures is stored in a file in the system's database.

A scanning engine 7 compares the signatures 30 of the viewing segments with the reference signatures 40 of each broadcast source 50, and outputs corresponding matches. In the case of the present invention, each match between a meter signature and a reference signature of any broadcast source is stored in memory during the process. A string of consecutive matches between the meter signatures and the signatures of each broadcast source is called a "tracking segment" 60, which is also stored and used by the system to identify the broadcast source of the viewed content. In the example shown in FIG. 2, the matching engine outputs a tracking segment corresponding to broadcast source A during t1 and t2 (viewing segment 21), a tracking segment corresponding to broadcast source B between t3 and t4 (viewing segment 22), and a tracking segment corresponding to broadcast source C between t5 and t6 (viewing segment 23).

In the case of simulcast, two or more tracking segments can be associated to a same viewing segment. In the example shown in FIG. 2, during viewing segment 24 the scanning engine 7 outputs two tracking segments of different time lengths: a longer one 61 corresponding to broadcast source A and a shorter one 62 corresponding to broadcast source B. During t7 and t8 the two broadcast sources where transmitting different content and during t8 and t9 the simulcast situation took place. The scanning engine 7 assigns the viewing segment to the broadcast source with the longest tracking segment, as this segment contains extra information that allows the system to identify the viewed broadcast source based on the non-simulcast matched signatures. In this case, the information prior to the simulcast situations is used to identify the broadcast source. Another example of multicast is given in the case of segment viewing segment 25, where the scanner outputs two tracking segments, both starting at the same time t10: a shorter one 63 corresponding to broadcast source A and a longer one 64 corresponding to broadcast source B. The simulcast situation, in the example, corresponds to the time period between t10 and t11. As in the previous example, the scanning engine 7 assigns the viewing segment to the broadcast source with the longest tracking segment (broadcast source B in the example) as this segment contains information about the viewing session during the non-simulcast period that followed between t11 and t12.

In order to determine which of several tracking segments during a simulcast corresponds to the viewing segments the method of the current invention makes a decision based on the "rule of the longest tracking segment" explained in the previous examples. The method is further described in what follows.

Broadcasting environments are characterized by two different types of simulcast behavior: "permanent simulcast", and "scattered simulcast". Permanent simulcast is characterized by two or more broadcast sources broadcast exactly the same content throughout the day. Scattered simulcast is characterized by two or more broadcast sources alternately broadcast the same content or different content during certain periods of time. By way of example, scattered simulcast happens when local or regional broadcast sources broadcast throughout the day the same content (usually national networks), but introducing local content during the commercial breaks or other predefined periods of time. The "rule of the longest segment" addresses the case of scattered simulcast, where the simulcast period of two or more broadcast sources is preceded or followed by a period of time during which the content is different for each broadcast source. Other examples of scattered simulcast include the case in which the same film or portions of the same film are available simultaneously from more than one broadcast source. It is important to note that time-shift environments like those offered by contemporary broadcast platforms may produce virtual simulcast situations where a consumer can choose the same piece of content that is available from different broadcast sources at different times, or even from libraries offering pieces of content on an "on-demand" basis. In all these situations, the task of a content matching engine that needs to identify the content being consumed in a measured television set faces a much higher probability of finding identical pieces of content broadcast from several sources at different times or modes. The present invention provides a solution to the problem of maximizing the probability of correctly identifying the correct broadcast source from which such content is being consumed. For this purpose, the matching engine is programmed in such a way that whenever two or more candidates are found for any unknown viewing segment, the longest tracking segment is chosen.

Figure 3:
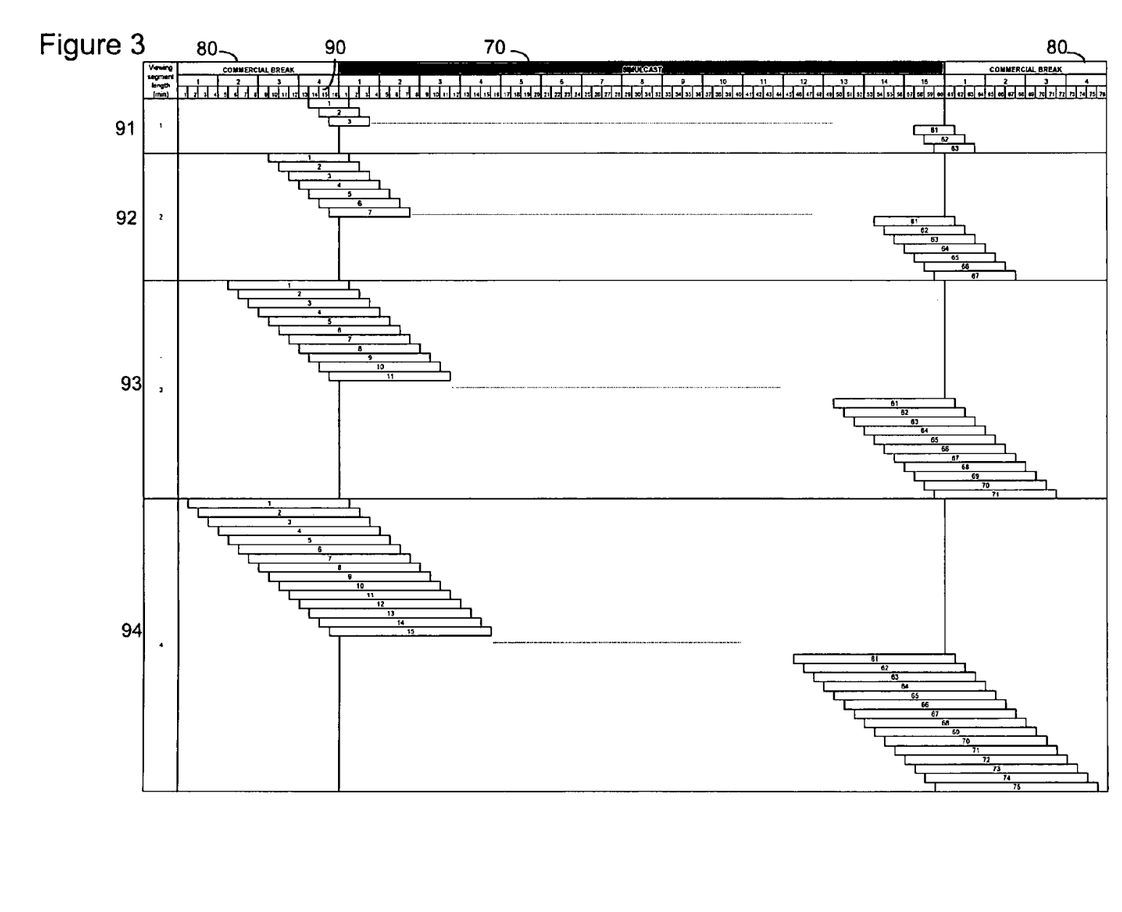
FIG. 3 depicts combinations of a simulcast transmission with viewing sessions of different lengths.

An example of application of the present invention follows. FIG. 3 represents a typical case of syndicated transmissions, wherein two or more broadcast sources transmit a program in simulcast for a predefined length of time 70 (fifteen minutes in the example), inserting their own commercial breaks 80 for another predefined length of time (four minutes for commercial breaks 80 in the example shown in FIG. 3). A diagram is shown that describes the possibility of solving simulcast situations, given different viewing segment durations, and assuming a "persistence threshold" 90 of fifteen seconds. In the first case, one minute duration 91 is assumed for the viewing segment. Under these conditions, a total of sixty three viewing segments one every fifteen seconds could overlap with the simulcast period of fifteen minutes. Of those sixty three segments, fifty seven would fall entirely within the simulcast period, rendering it impossible for the matching engine to determine the identity of the viewed broadcast source. In turn, six out of these sixty three one-minute segments would include signatures of non-simulcast content, allowing the identification of the viewed broadcast source by means of the corresponding tracking segments.

The same analysis is repeated for viewing segment lengths of two, three and four minutes (92, 93 and 94 respectively in FIG. 3), and is valid for any viewing segment shorter than the simulcast period. The total number of segments that could include a portion of simulcast (Total Simulcast Segments) is given by the formula:

$$TSS = \frac{ST + VSL - PT}{PT}$$

Where,
TSS: Total Simulcast segments
ST: Simulcast Time (seconds) (70 in FIG. 3)
VSL: Viewing Segment Length (seconds) (91, 92, 93 and 94 in FIG. 3)
PT: Persistence threshold (seconds) (90 in FIG. 3)

The number of segments that include a non-simulcast portion, and can be therefore identified through the signatures of the non-simulcast content (Solved Simulcast Segments), is given by the formula:

$$TSS = \frac{2*(VSL - PT)}{PT}$$

Where,
SSS: Solved Simulcast Segments
VSL: Viewing Segment Length (seconds)
PT: Persistence threshold (seconds)
Given the above formulas, the Simulcast Resolution Factor (SRF) of the rule of the longest tracking segment is:

$$SRF = \frac{SSS}{TSS} = \frac{2*(VSL-PT)}{(ST+VSL-PT)}$$

Figure 4:
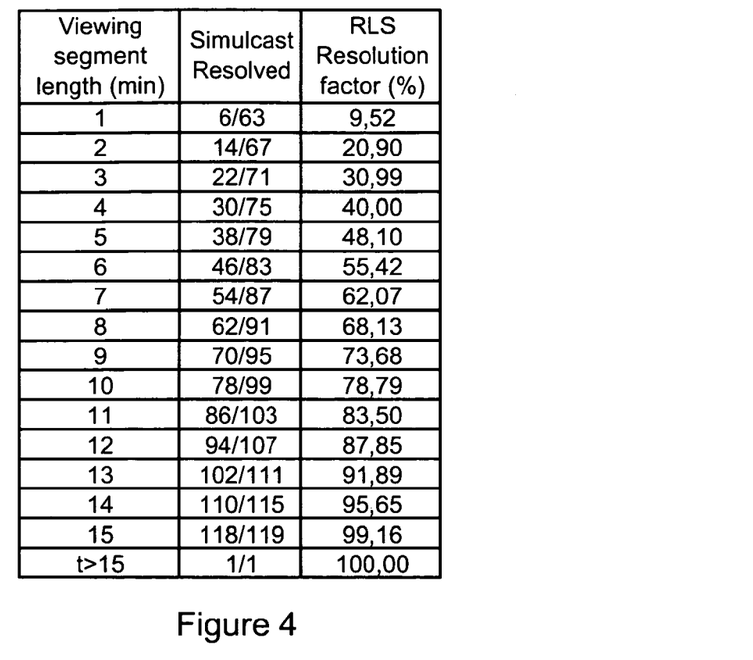
FIG. 4 is a table with the simulcast resolution factor for different viewing segment lengths.

FIG. 4 shows a table with the SRF value for viewing segment lengths ranging from one to fifteen minutes (length of the simulcast transmission period) in the first column. The second column shows the average Simulcast Resolution Factor for the given ranges and a persistence time of fifteen seconds. The third column indicates the percentage of simulcast segments resolved by the rule of the longest tracking segment for viewing segment length.

Figure 4A:
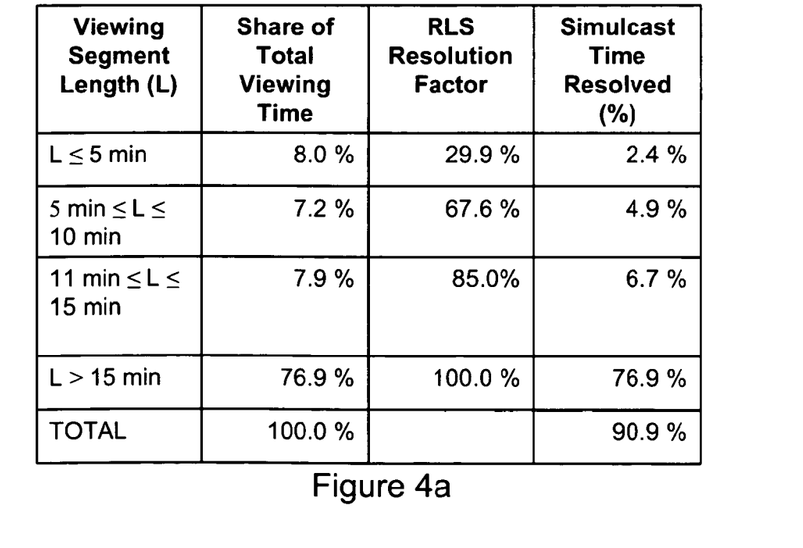
FIG. 4A is a table showing the results of an implementation of a method and system according to the present invention.

By way of example, FIG. 4A shows a table with the results of the implementation of a system and method according to the present invention in a television market. The first column includes four different viewing segment length ranges. The second column indicates the corresponding share of total viewing time for those viewing segment length ranges. The third column shows the average resolution factors corresponding to those ranges using the rule of the longest segment described in the present invention. The fourth column indicates the percentage of total simulcast viewing time that is solved in each case. As can be seen in the example of FIG. 4A, in a television environment with viewing patterns similar to the ones provided in FIG. 4, about 90.9% of the total simulcast viewing time in such circumstances can be correctly identified by applying the present invention.

More generally, the longer the viewing segments the higher the probability of identifying the correct source using the present invention, since the probability of encountering a different part, either at the head or at the tail of the segment, becomes correspondingly higher. Since most media consumption of broadcast content tends to happen in segments a few minutes long, the present invention contributes to reducing the impact of simulcast situations in the accuracy of the output data. The remainder of segments that do not converge to a single broadcast source (more likely to be short segments) may be then determined by some other method, if available.

Figure 5A:
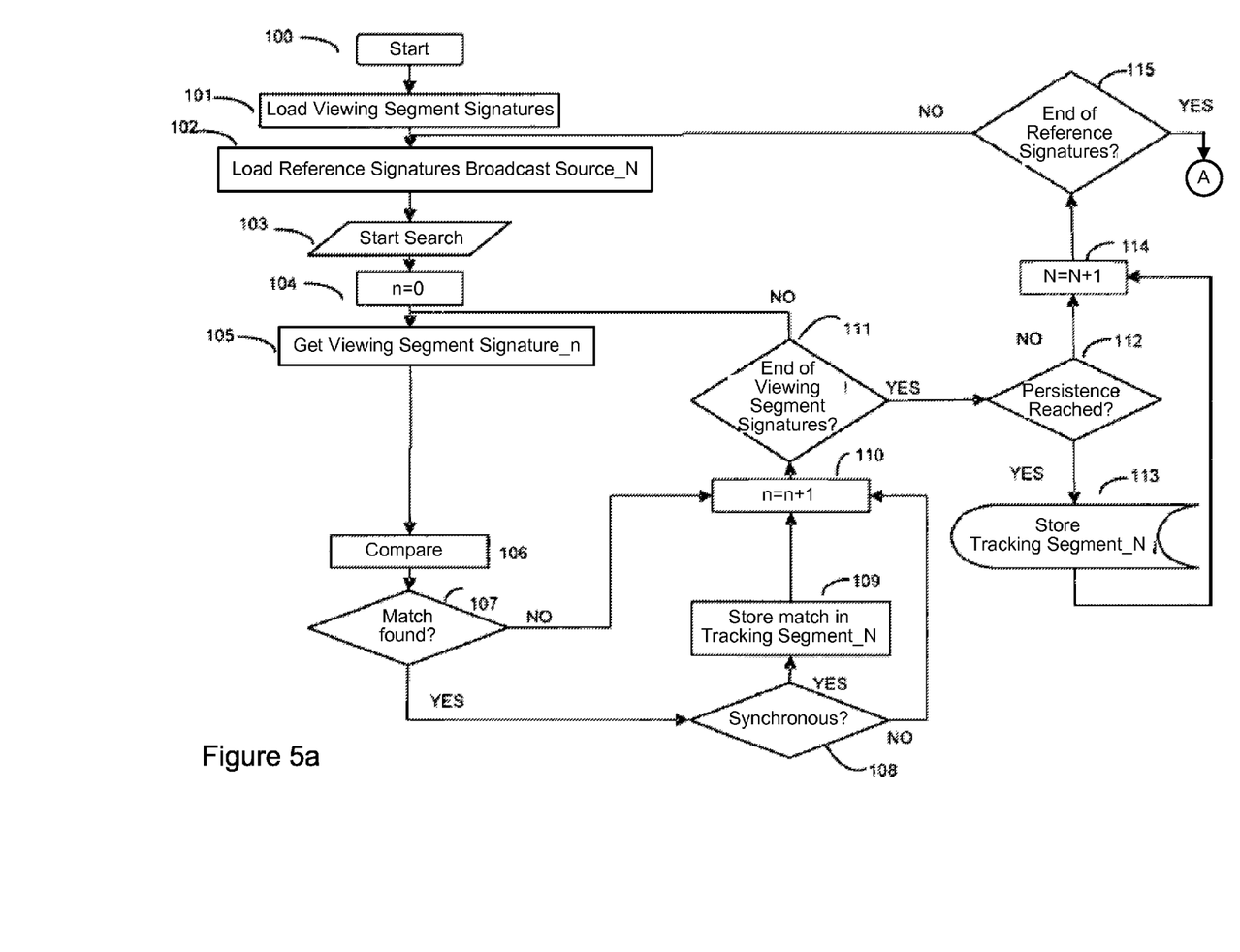
Figure 5B:
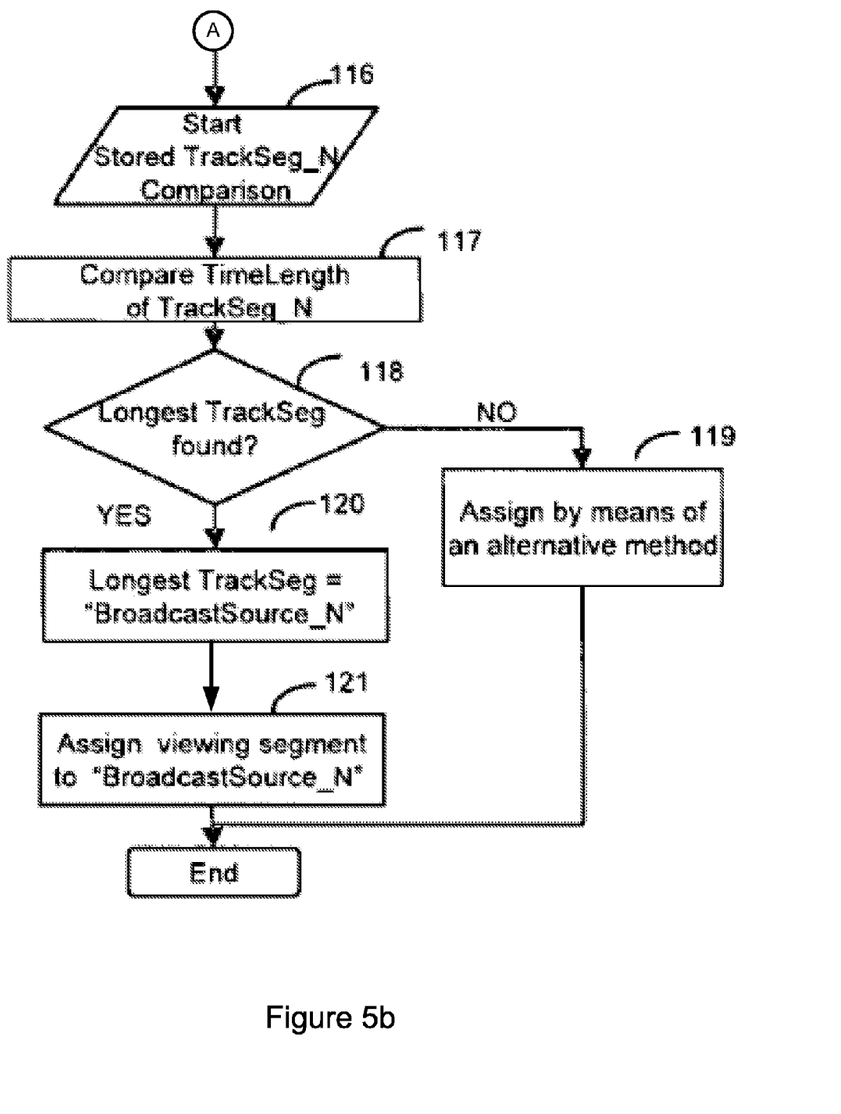

FIG. 5 shows a process 100 according to an exemplary embodiment of the invention to implement the rule of the longest tracking segment. The process 100 is executed for each sampled viewing segment wherein the broadcast source needs to be identified. The process 100 is executed as a computer program comprising executable program instructions in a processor, such as scanning engine 7. The process 100 begins at block 101 of FIG. 5, at which the viewing segment's signatures generated by a metering device located in a household are loaded. At block 102, a file containing the reference signatures of a broadcast source relevant to the metered household is loaded. The total amount of files to be loaded will be determined by the location of the household (signals availability, i.e., terrestrial, satellite and cable networks) and the receiving devices (possibility to decode the aforementioned available signals). Once the meter and reference signatures have been loaded, the process starts a search process 103.

Assuming that each signature of each viewing segment is both time stamped and numbered, the program sets in block 104 a counter at n=0 for each new viewing segment to be analyzed. In block 105 the program gets the signature indicated by the counter, until the end of the viewing segment is reached, as indicated in block 111. At block 106 the process compares the previously loaded reference signatures of a certain Broadcast Source N searching for a match between viewing segment's signature n and any reference signature of Broadcast Source N. If the viewing segment has been previously identified as live viewing (by a system process not included in the program described in FIG. 5), the timestamp of the viewing segment's signature n is taken into account, and the search is limited to a range given by the time of occurrence of the signature plus/minus (+/−) a predefined time tolerance (e.g., 15 seconds), given the fact that the reference signatures are also time stamped in a synchronized way. If, however, the viewing segment has been previously identified as time-shifted viewing (by a system process not included in the program described in FIG. 5), the file loaded in block 102 should include the reference signatures of Broadcast Source N for a predefined amount of days (for example, current day plus previous day, plus last week, plus last months, etc.).

If a match is found (block 107) the process proceeds to block 108 to check if the reference signature that matches the viewing segment's signature is synchronous with the previous matched reference signature (i.e., the time interval between the two signatures in the viewing segment is exactly the same as the one between the two corresponding matching signatures in the reference signatures file). If so (or always in the case of the first signature of each viewing segment), the process stores the matching signature appending it to the previously saved signatures, creating in this way a Tracking Segment for Broadcast Source N (block 109). The process then increments the signature counter (block 110) and repeats the matching process for the next signature until the end of the viewing segment is reached (block 111). When this happens the process compares in block 112 the time length value of the Tracking Segment N saved in block 110 (that is given by the difference between the time stamps of the last and first matched signatures) with the persistence threshold value that has been previously defined. If the time length is greater or equal than the persistence threshold, the process at block 113 stores the Tracking Segment for Broadcast Source N for later comparison with Tracking Segments from other broadcast sources, increments the Reference Signatures counter (block 114), checks the existence of new Reference Signature to be matched (block 115), loads the Reference Signatures for the new broadcast source (block 102), and starts a new search (block 103) comparing the signatures of the viewing segment with the reference signatures of Broadcast Source N+1. If at block 112 the time length of the Tracking Segment is lower than the persistence threshold, the Tracking Segment is discarded, and the process proceeds to block 114, already described.

When the end of the Reference Signatures is reached at block 115, the process starts a comparison process of all the Tracking Segments stored at block 113. At block 117, the process compares the time length of the stored Tracking Segments, searching the one with the longest duration. If, at block 118, the process finds that no single Tracking Segment is longer than the others, it cannot identify the Viewing Segment under analysis and outputs a corresponding message ("Assign by means of an alternative method" at block 119 in the example shown in FIG. 5, assuming that yet another method is used in these cases). If at block 118 the longest Tracking Segment is found, the process identifies the Broadcast Source having said longest tracking segment at block 120. The process then assigns the Viewing Segment to the Broadcast Source identified in the previous step, and outputs the result (Longest TrackSeg="Broadcast Source N" at block 121 in the example).

Once a Viewing Segment has been assigned to a broadcast source, the process restarts at block 100, loads the signatures of a new Viewing Segment (block 101), and repeats the search, matching and comparison steps until all the viewing segments generated by the metering device are processed.

Without prejudice to the underlying principle of the invention, the details and embodiments may vary, also significantly, with respect to what has been described and shown by way of example only, without departing from the scope of the invention as defined by the annexed claims.

It will be apparent to those skilled in the art that the present invention may be advantageously applied in various processes involving identifications of broadcast sources, in a variety of media formats, including television and radio programs broadcast via a variety of communication means, like cable networks, satellite networks, Internet links, etc.

What is claimed is:

1. A method to identify media sources, the method comprising:
   comparing, with a processor, meter signatures generated from presented media with reference signatures generated from reference media provided by a plurality of media sources, the meter signatures and the reference signatures having respective timestamps;
   determining, with the processor, whether a first time difference between a first meter signature and a second meter signature is equivalent to a second time difference between a first reference signature determined to match the first meter signature and a second reference signature determined to match the second meter signature, the first and second reference signatures being associated with a first one of the media sources;
   in response to determining that the first time difference and the second time difference are equivalent, appending, with the processor, the second reference signature to a first tracking segment associated with the first one of the media sources to cause a first time length associated with the first tracking segment to be increased based on a respective timestamp associated with the second reference signature; and
   evaluating, with the processor, the first time length to determine whether the first one of the media sources provided the presented media.

2. A method as defined in claim 1, wherein evaluating the first time length includes comparing the first time length to a second time length associated with a second tracking segment, the second tracking segment being associated with a second one of the media sources.

3. A method as defined in claim 2, further including determining that the first one of the media sources provided the presented media in response to determining that the first time length exceeds the second time length.

4. A method as defined in claim 1, wherein evaluating the first time length includes:
   determining whether the first time length associated with the first tracking segment corresponds to a longest time length among a plurality of tracking segments associated with the plurality of media sources; and
   if the first time length corresponds to the longest time length, determining that the first one of the media sources provided the presented media.

5. A method as defined in claim 4, further including discarding ones of the tracking segments having respective time lengths that do not satisfy a threshold.

6. A method as defined in claim 4, further including indicating that source identification for the presented media was unsuccessful when multiple ones of the plurality of tracking segments are determined to have the longest time length.

7. A method as defined in claim 1, wherein the second meter signature is a next meter signature relative to the first meter signature in a sequence of meter signatures including the first meter signature and the second meter signature.

8. A machine readable storage device or storage disk comprising machine readable instructions which, when executed, cause a machine to at least:
   compare meter signatures generated from presented media with reference signatures generated from reference media provided by a plurality of media sources, the meter signatures and the reference signatures having respective timestamps;
   determine whether a first time difference between a first meter signature and a second meter signature is equivalent to a second time difference between a first reference signature determined to match the first meter signature and a second reference signature determined to match the second meter signature, the first and second reference signatures being associated with a first one of the media sources;
   in response to determining the first time difference and the second time difference are equivalent, append the second reference signature to a first tracking segment associated with the first one of the media sources to cause a first time length associated with the first tracking segment to be increased based on a respective timestamp associated with the second reference signature; and
   evaluate the first time length to determine whether the first one of the media sources provided the presented media.

9. A machine readable storage device or storage disk as defined in claim 8, wherein the instructions, when executed, further cause the machine to compare the first time length to a second time length associated with a second tracking segment, the second tracking segment being associated with a second one of the media sources.

10. A machine readable storage device or storage disk as defined in claim 9, wherein the instructions, when executed, further cause the machine to determine that the first one of the media sources provided the presented media in response to determining that the first time length exceeds the second time length.

11. A machine readable storage device or storage disk as defined in claim 8, wherein the instructions, when executed, further cause the machine to:
   determine whether the first time length associated with the first tracking segment corresponds to a longest time length among a plurality of tracking segments associated with the plurality of media sources; and
   if the first time length corresponds to the longest time length, determine that the first one of the media sources provided the presented media.

12. A machine readable storage device or storage disk as defined in claim 11, wherein the instructions, when executed, further cause the machine to discard ones of the tracking segments having respective time lengths that do not satisfy a threshold.

13. A machine readable storage device or storage disk as defined in claim 11, wherein the instructions, when executed, further cause the machine to indicate that source identification for the presented media was unsuccessful when multiple ones of the plurality of tracking segments are determined to have the longest time length.

14. A machine readable storage device or storage disk as defined in claim 8, wherein the second meter signature is a next meter signature relative to the first meter signature in a sequence of meter signatures including the first meter signature and the second meter signature.

15. An apparatus to identify media sources, the apparatus comprising:
  a scanning engine to:
    compare meter signatures generated from presented media with reference signatures generated from reference media provided by a plurality of media sources, the meter signatures and the reference signatures having respective timestamps;
    determine whether a first time difference between a first meter signature and a second meter signature is equivalent to a second time difference between a first reference signature determined to match the first meter signature and a second reference signature determined to match the second meter signature, the first and second reference signatures being associated with a first one of the media sources;
    in response to determining the first time difference and the second time difference are equivalent, append the second reference signature to a first tracking segment associated with the first one of the media sources to cause a first time length associated with the first tracking segment to be increased based on at least a respective timestamp associated with the second reference signature; and
    evaluate the first time length to determine whether the first one of the media sources provided the presented media; and
  a memory to store the first tracking segment.

16. An apparatus as defined in claim 15, wherein the scanning engine is further to compare the first time length to a second time length associated with a second tracking segment, the second tracking segment being associated with a second one of the media sources.

17. An apparatus as defined in claim 16, wherein the scanning engine is further to determine that the first one of the media sources provided the presented media in response to determining that the first time length exceeds the second time length.

18. An apparatus as defined in claim 15, wherein the scanning engine is further to:
  determine whether the first time length associated with the first tracking segment corresponds to a longest time length among a plurality of tracking segments associated with the plurality of media sources; and
  if the first time length corresponds to the longest time length, determine that the first one of the media sources provided the presented media.

19. An apparatus as defined in claim 18, wherein the scanning engine is further to discard ones of the tracking segments having respective time lengths that do not satisfy a threshold.

20. An apparatus as defined in claim 18, wherein the scanning engine is further to indicate that source identification for the presented media was unsuccessful when multiple ones of the plurality of tracking segments are determined to have the longest time length.

21. An apparatus as defined in claim 15, wherein the second meter signature is a next meter signature relative to the first meter signature in a sequence of meter signatures including the first meter signature and the second meter signature.

22. An apparatus for identifying media sources, the apparatus comprising:
  means for comparing meter signatures generated from presented media with reference signatures generated from reference media provided by a plurality of media sources, the meter signatures and the reference signatures having respective timestamps;
  means for determining whether a first time difference between a first meter signature and a second meter signature is equivalent to a second time difference between a first reference signature determined to match the first meter signature and a second reference signature determined to match the second meter signature, the first and second reference signatures being associated with a first one of the media sources;
  means for appending, in response to determining that the first time difference and the second time difference are equivalent, the second reference signature to a first tracking segment associated with the first one of the media sources to cause a first time length associated with the first tracking segment to be increased based on a respective timestamp associated with the second reference signature; and
  means for evaluating the first time length to determine whether the first one of the media sources provided the presented media.

* * * * *